United States Patent [19]

Hofer et al.

[11] 3,957,765

[45] May 18, 1976

[54] AROMATIC HETEROCYCLIC HYDRAZIDE DERIVATIVES

[75] Inventors: Kurt Hofer, Munchenstein; Guenther Tscheulin, Rieben, both of Switzerland

[73] Assignee: Sandoz Ltd., Basel, Switzerland

[22] Filed: Apr. 1, 1974

[21] Appl. No.: 456,630

[30] Foreign Application Priority Data

Apr. 5, 1973   Switzerland.......................... 4917/73

[52] U.S. Cl. .................... 260/240 G; 260/45.8 NT;
260/240.1; 260/248 CS
[51] Int. Cl.[2]............... C07D 251/08; C07D 401/14;
C07D 413/04; C07D 413/14
[58] Field of Search...... 260/240 G, 240 A, 248 CS, 260/45.8 N, 45.8 NT, 240.1

[56] References Cited

UNITED STATES PATENTS

| | | | |
|---|---|---|---|
| 3,296,188 | 1/1967 | Leu................................. | 260/45.8 N |
| 3,530,127 | 9/1970 | Biland et al. ............ | 260/45.8 NT X |
| 3,629,189 | 12/1971 | Minagawa et al. ....... | 260/45.8 NT X |
| 3,673,152 | 6/1972 | Minagawa et al. ....... | 260/45.8 N UX |
| 3,706,740 | 12/1972 | Dexter et al. ................. | 260/248 CS |

OTHER PUBLICATIONS

Chem. Abs., Vol. 74, 1971, 32847a, Article by Belyabov et al., "Stabilization of Cellulose Esters (Ethers)."

*Primary Examiner*—Allen B. Curtis
*Attorney, Agent, or Firm*—Gerald D. Sharkin; Richard E. Vila; Joseph J. Borovian

[57] ABSTRACT

The present invention concerns novel aromatic heterocyclic hydrazide derivatives of the formula:

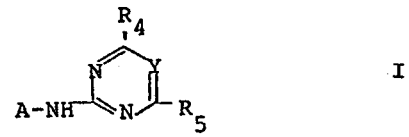

wherein A is a radical

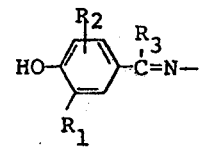

wherein $R_1$ is tertiary alkyl and $R_2$ and $R_3$ are hydrogen or substituents, e.g. alkyl, $R_4$ is a group $-X-R_{14}$ wherein X is a bridging function, e.g. O, and $R_{14}$ is a substituent, e.g. alkyl, a heterocyclic group

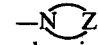

wherein Z, with the nitrogen atom, forms a heterocyclic ring or a radical -NH-A, wherein A is as defined above, $R_5$ has inter alia one of the significances of $R_4$ and Y is -N= or -CH=, which are useful antioxidants, e.g. for stabilizing plastics material.

10 Claims, No Drawings

AROMATIC HETEROCYCLIC HYDRAZIDE DERIVATIVES

The present invention relates to aromatic heterocyclic hydrazide derivatives and in particular to pyrimidinyl and S-triazinyl hydrazide derivatives possessing antioxidant properties.

Accordingly, the present invention provides compounds of formula I,

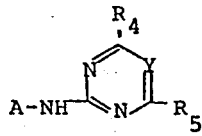

wherein A is a radical

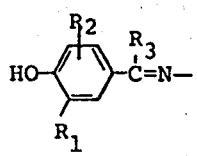

wherein $R_1$ is tertiary alkyl ($C_4$-$C_9$),
$R_2$ is hydrogen, alkyl ($C_1$-$C_{18}$), cycloalkyl ($C_5$-$C_{12}$), cycloalkylalkyl ($C_6$-$C_{12}$), or aralkyl ($C_7$-$C_{12}$), and
$R_3$ is hydrogen, alkyl ($C_1$-$C_{18}$), phenyl or phenyl substituted by 1 or 2 alkyl ($C_1$-$C_4$) groups,
$R_4$ is a group —X—$R_{14}$ wherein X is O, S, —NH or —N—$R_{14}$ and
$R_{14}$ is alkyl ($C_1$-$C_{18}$), cycloalkyl ($C_5$-$C_{12}$), cycloalkylalkyl ($C_6$-$C_{12}$), aralkyl ($C_7$-$C_{12}$), phenyl, or phenyl or aralkyl substituted on the aromatic nucleus by hydroxyl, 1, 2 or 3 halogen atoms, phenyl, benzyl, phenoxy, 1, 2 or 3 alkyl ($C_1$-$C_8$) groups with $C_1$-$C_{12}$ in the aggregate thereof and/or 1, 2 or 3 alkoxy ($C_1$-$C_{18}$) groups with $C_1$-$C_{18}$ in the aggregate thereof, the total number of substituents on the aromatic nucleus being 1 to 3, a heterocyclic group —N⟩Z wherein Z, with the nitrogen atom, forms a 5 or 6 members heterocyclic ring containing 1 or 2 heteroatoms, or a radical —NH—A
wherein A is as defined above,
$R_5$ has one of the significances of $R_4$ or is alkyl ($C_1$-$C_{12}$), phenyl or phenyl substituted by 1 or 2 alkyl ($C_1$-$C_6$) groups and
Y is —N= or —CH=.

Preferred are compounds of formula Ia,

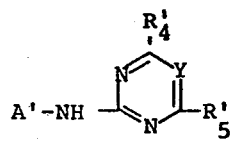

wherein A' is a radical

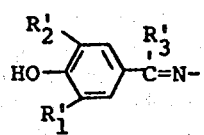

wherein $R_1'$ is tertiary alkyl ($C_4$-$C_6$),
$R_2'$ is alkyl ($C_1$-$C_8$), cycloalkyl ($C_5$-$C_8$) or cycloalkylakyl ($C_6$-$C_8$) and
$R_3'$ is hydrogen, alkyl ($C_1$-$C_{12}$) or phenyl, $R_4'$ is a group —X'—$R_{14}'$ wherein X' is O, S, —NH or —N—$R_{14}'$ and
$R_{14}'$ is alkyl ($C_1$-$C_{18}$), cycloalkyl $C_5$-$C_{12}$), cycloalkyalky $C_6$-$C_{12}$), aralkyl ($C_7$-$C_{12}$), phenyl or phenyl or aralkyl ($C_7$-$C_{12}$) substituted on the aromatic nucleus by 1 or 2 alkyl ($C_1$-$C_{12}$) groups and/or 1 or 2 alkoxy ($C_1$-$C_{12}$) groups, the total number of substituents on the aromatic nucleus being 1 or 2,
a piperidino, piperazino, morpholino, pyrolidino or imidazolidino ring, or a radical —NH—A',
wherein A' is as defined above,
$R_5'$ has one of the significances of $R_4'$ or is alkyl ($C_1$-$C_{12}$) or phenyl, and
Y is as defined above.

More preferred compounds are compounds of formula Ib,

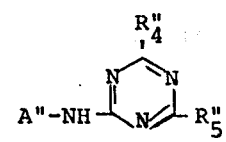

wherein A' is a radical

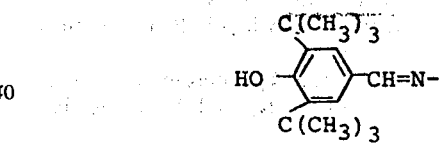

$R_4''$ is a group —X''—$R_{14}''$ wherein X'' is S,

—NH, —N—$CH_3$ or —N—$C_2H_5$ and
$R_{14}''$ is alkyl ($C_1$-$C_{12}$), benzyl, phenyl or phenyl substituted by alkyl ($C_1$-$C_4$) or alkoxy ($C_1$-$C_4$),
a piperidino or morpholino ring, or a radical —NH—A''
$R_5''$ has one of the significances of $R_4''$.

Particularly preferred compounds are the compounds of formula Ic

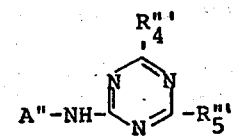

wherein A'' is as defined above, and $R_4'''$ and $R_5'''$ are each, independently, a piperidino or morpholino ring.

It is to be understood that by the term "halogen" as employed herein is meant fluorine, chlorine or bromine, preferably chlorine. In addition, where a substituent is or includes alkyl, then unless otherwise indicated, this may be straight or branched chain, primary, secondary or tertiary.

Examples of primary radicals are methyl, ethyl, propyl, butyl, pentyl, hexyl and the unbranched alkyl radicals containing from 7 to 18 carbon atoms.

Examples of secondary alkyl radicals are isopropyl, 2-butyl.

Examples of tertiary alkyl radicals are tertiary butyl, 2-methyl-2-butyl, tertiary octyl.

Examples of cycloalkyl radicals are cyclopentyl, cyclohexyl, cyclododecyl.

Examples of cycloalkylalkyl radicals are cyclohexylmethyl, 2-cyclohexylethyl.

Examples of aralkyl radicals are benzyl, 2-phenylethyl.

Preference is given to the compounds of formula I which only contain

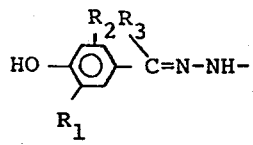

The present invention also provides a process for the production of a compound of formula I, which comprises a. condensing a compound of formula II,

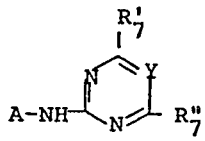     II wherein A and Y are as defined above,
$R_7'$ is chlorine or a group $R_4$, wherein $R_4$ is as defined above,
$R_7''$ is chlorine or a group $R_5$, wherein $R_5$ is as defined above, at least one of $R_7'$ and $R_7''$ being chlorine,
with a compound of formula III,

     III wherein $R_4$ is as defined above and
M is hydrogen or an alkali metal cation,
b. condensing a compound of formula IV,

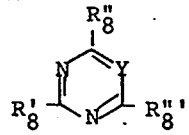     IV wherein Y is as defined above,
$R_8'$ is —NH—$NH_2$ or a radical —NH—A wherein A is as defined above,
$R_8''$ is —NH—$NH_2$ or a radical $R_4$, wherein $R_4$ is as defined above and
$R_8'''$ is —NH—$NH_2$ or a radical $R_5$, wherein $R_5$ is as defined above, at least one of $R_8'$, $R_8''$ and $R_8'''$ being —NH—$NH_2$,
with a compound of formula V,

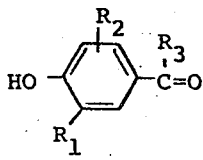     V wherein $R_1$, $R_2$ and $R_3$ are as defined above, or
C. condensing a compound of formula VI,

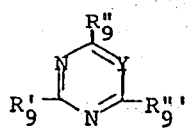     VI wherein Y is as defined above
$R_9'$ is chlorine or a radical —NH—A wherein A is as defined above,
$R_9''$ is chlorine or a radical $R_4$, wherein $R_4$ is as defined above and
$R_9'''$ is chlorine or a radical $R_5$, wherein $R_5$ is as defined above, at least one of $R_9'$, $R_9''$ and $R_9'''$ being chlorine,
with a compound of formula VII,

     VII wherein A is as defined above, preferably by process (a).

The processes (a), (b) and (c) above may be effected in accordance with analogous processes. Thus, the reactants are preferably dissoved in an inert organic solvent, e.g. benzene, toluene, petroleum ether and dioxane and heated, conveniently at the boiling point of the reaction mixture under reflux. In general, in processes (a) and (b), it is preferable to employ an acid acceptor such as a tertiary amine, e.g. pyridine or triethylamine, or an inorganic base such as sodium bicarbonate.

Working up may be effected in conventional manner.

The intermediates employed in processes (a), (b) and (c) may be produced in known manner from readily available starting materials. If desired, said intermediates may be produced in situ in the production of the final compounds, e.g. by reaction of a mixture of hydrazine, a compound of formula VI and a compound of formula V.

The compounds of formula I are useful antioxidants, i.e. they protect sensitive organic material from degradation under the effect of oxidation as indicated in the following tests 1 and 2 below viz:

Polypropylene powder is intimately mixed with 0.4 % by weight of the test compound and the mixture kneaded on a roller mill at 180°C for 5 minutes. The kneaded mixture is then pressed into discs of 18 mm diameter and 1 mm thickness. The plastic discs so produced and incorporating the test compounds are employed in Tests 1 and 2.

Test 1: The polypropylene discs incorporating the test compounds, e.g. the compound of formula

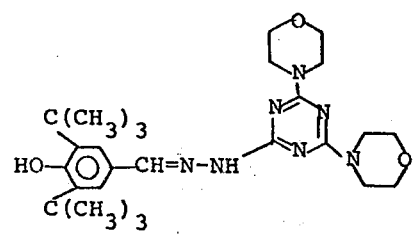

are stored in an hermetically sealed chamber having an oxygen atmosphere, at a temperature of 190°C and an initial excess pressure of 200 mm Hg. The temperature of each polypropylene disc is kept constant, the excess pressure of oxygen, which falls with oxidation of the polymer, being monitored. The period, in minutes, for the excess oxygen pressure to be reduced to zero is measured.

The results are compared with an unstabilized control disc tested under the same conditions. A fall in pressure in the case of the stabilized discs which is slower in rate than that in the case of the unstabilized disc indicates an anti-oxidant effect of the test compound.

Test 2: The polypropylene discs incorporating the test compounds, e.g. the compound of formula

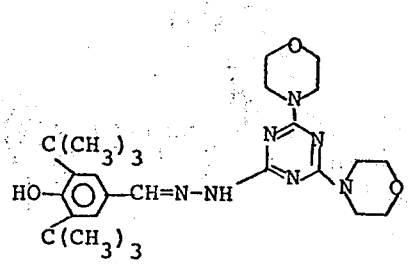

are stored in a hot air oven at a constant temperature of 140°C and the time in hours is measured for a distinct change in the physical appearance of each disc to occur, e.g. surface cracking, blooming or colour change.

The times recorded in the case of the stabilized discs are compared with the time recorded for an unstabilized disc. A longer time in the case of the stabilized disc indicates an anti-oxidant effect of the test compound.

The compounds of formula I are therefore useful in the stabilization of organic material, particularly plastics material, susceptible to oxidation, by a method which comprises treating the organic material with a compound of formula I.

It is to be understood that by the term "treating" is meant either surface coating the organic material with the compound of formula I, in the form of a film, or incorporating the compound of formula I into the body of the organic material, preferably the latter, in manner known per se.

The above method also forms part of the present invention.

According to a first embodiment of the method of the invention, the anti-oxidant is intimately mixed with a particulate form of, for example, a plastics material, such as polypropylene, e.g. polypropylene granules, in a kneader or other suitable device, to obtain uniform distribution of the anti-oxidant throughout the plastics material. The plastics material may thereafter be formed into final shape, e.g. by extrusion or injection moulding to form, e.g., extruded filaments to be made up into textile materials.

According to a second embodiment of the method of the present invention, particularly suited to stabilization of polymers or copolymers susceptible to degradation by oxidation, e.g. polypropylene, the anti-oxidant is mixed with the monomer or prepolymer before polymerisation is effected, to yield the polymer or copolymer having the anti-oxidant uniformly distributed therethrough. The polymer or copolymer may thereafter be extruded, moulded or otherwise formed into final shape.

Examples of organic materials susceptible to oxidation and embraced by the method of the present invention are polyolefins, in particular polyethylene and polypropylene, polyesters, polymethylmethacrylates, polyphenyleneoxides, polyurethanes, polystyrene, ABS terpolymers, polyamides such as nylon, polypropylene oxide, polyacrylonitrile and corresponding copolymers and natural products such as rubber.

Preferably, the compounds according to the invention are used for stabilizing polypropylene, polyethylene, polyester, polyamide, polyurethanes, polyacrylonitrile, ABS terpolymers, terpolymers of acrylic ester, styrene, and acrylonitrile, copolymers of styrene and acrylonitrile or styrene and butadiene.

Stabilized organic materials according to the invention may exist in solid form, e.g. solid foams such as foam plastics, panels, rods, coatings, sheets such as paper, films, tapes, fibres, granules or powders, or in liquid form, e.g. solutions, emulsions or dispersions such as polishes, paints and creams.

The organic material may also be treated with other additives, e.g. heat and u.v. stabilizers. Other additives that may be mentioned are 2-hydroxybenzophenones, organic sulphur compounds, tin and trivalent phosphorus compounds and nickel salts of carboxylic acids.

The amount of anti-oxidant employed in the method of the present invention will of course vary with the mode of application, the compound employed and the nature of the organic material to be treated.

Thus, for example, when the mode of application is the uniform distribution of the anti-oxidant throughout the body of the organic material, then in general, satisfactory results are obtained when the amount of anti-oxidant employed is between 0.01 and 5 %, preferably between 0.05 and 1 % of the weight of organic material to be treated.

Examples of the process of the invention will now be described. Where temperatures are referred to, these are in °C. Where parts and percentages are referred to, these are by weight.

EXAMPLE 1

28.4 parts of 3,5-di-tertiary butyl-4-hydroxybenzaldehyde are added to a solution of 34 parts of 2,4-dimorpholino-6-hydrazino-s-triazine in 200 parts of benzene, the solution is heated at reflux for 12 hours, is cooled, the white crystals are filtered off and washed with petroleum ether. The melting point is 274° to 276°C. The compound of formula is obtained.

| Analysis | C | H | N |
|---|---|---|---|
| found | 62.6 | 7.8 | 19.7 |
| calculated | 62.8 | 7.9 | 19.8 |

EXAMPLE 2

20.8 parts of 3,5-di-tertiary butyl-4-hydroxybenzaldehyde are added to a solution of 26 parts of 2,4-dianilino-6-hydrazino-s-triazine in 200 parts of benzene, the solution is heated at reflux for 12 hours, is cooled, the white precipitate is filtered off and is recrystallized from ether/petroleum ether. The melting point is 153° to 156°C. The compound of formula

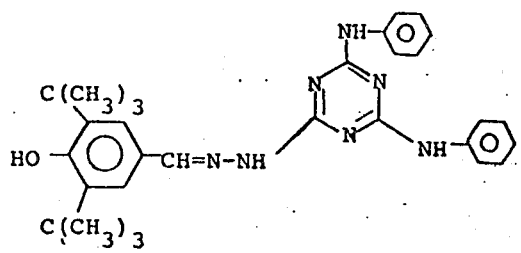

is obtained.

| Analysis | C | H | N |
|---|---|---|---|
| found | 71.1 | 6.7 | 19.1 |
| calculated | 70.7 | 6.9 | 19.2 |

EXAMPLE 3

A solution of 7.1 parts of 2-octyl mercapto-4,6-dihydrazino-s-triazine, 11.7 parts of 3,5-di-tertiary butyl-4-hydroxybenzaldehyde in 100 parts of benzene are heated under nitrogen at reflux for 5 hours, the solution is left to cool, the white precipitate is filtered off and is washed with hexane. The melting point is 249° to 251°C. The compound of formula

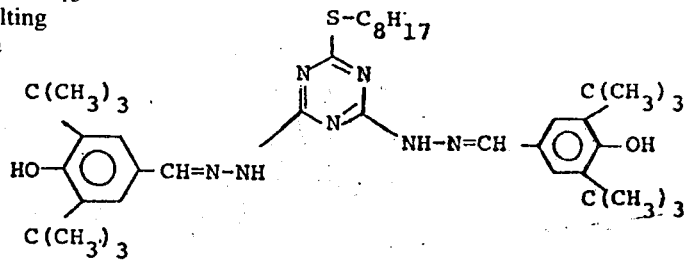

is obtained.

| Analysis: | C | H | N |
|---|---|---|---|
| found | 68.1 | 8.7 | 13.7 |
| calculated | 68.6 | 8.8 | 13.7 |

In a similar manner, the compounds listed in Table I are produced.

TABLE 1

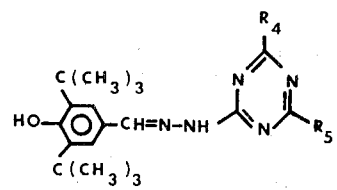

| Ex. No. | R$_4$ | R$_5$ | Analysis C | H | N | M.P. |
|---|---|---|---|---|---|---|
| 4 | ⟨⟩-CH₃-NH- | ⟨⟩-CH₃-NH- | fd. 71.3<br>cal. 71.5 | 7.6<br>7.3 | 18.3<br>18.2 | 239–241°C |
| 5 | H₃C-⟨⟩-NH- | H₃C-⟨⟩-NH- | fd. 70.8<br>cal. 71.5 | 7.3<br>7.3 | 18.1<br>18.2 | 167–170°C |
| 6 | ⟨N⟩- | ⟨N⟩- | fd. 68.1<br>cal. 68.1 | 8.8<br>8.8 | 19.9<br>19.9 | 277–278°C |

TABLE 1-continued

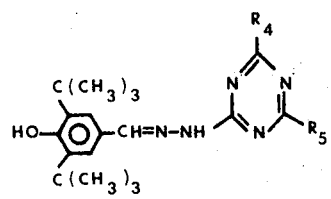

| Ex. No. | R₄ | R₅ | Analysis C | H | N | M.P. |
|---|---|---|---|---|---|---|
| 7 | 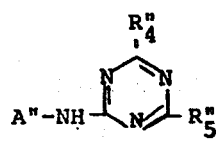 | 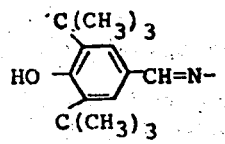 | fd. 67.4 cal. 67.3 | 7.8 7.6 | 18.8 18.9 | 152– 156°C |

What is claimed is:

1. A compound of the formula:

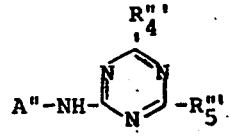

wherein A'' is a radical

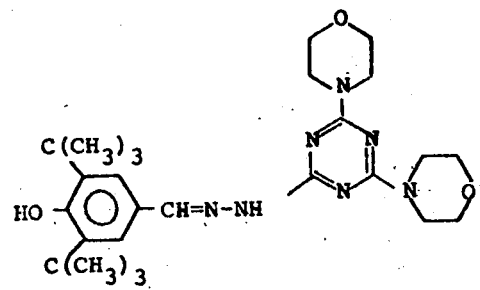

$R_4''$ is a group $—X''—R_{14}''$
wherein $X''$ is S, $-NH, -N-CH_3$ or $-N-C_2H_5$ and $R_{14}''$ is alkyl ($C_1$-$C_{12}$), benzyl, phenyl or phenyl substituted by alkyl ($C_1$-$C_4$) or alkoxy ($C_1$-$C_4$), a piperidino or morpholino ring or a radical —NH—A'' wherein A'' is as defined above, and $R_5''$ has one of the significances of $R_4''$.

2. A compound of claim 1, of the formula:

$$A''-NH-\underset{N}{\overset{R_4'''}{\underset{N}{\bigtriangleup}}}-R_5'''$$

wherein A'' is as defined in claim 1, and $R_4'''$ and $R_5'''$ are each, independently, a piperidino or morpholino ring.

3. A compound of claim 2, of the formula:

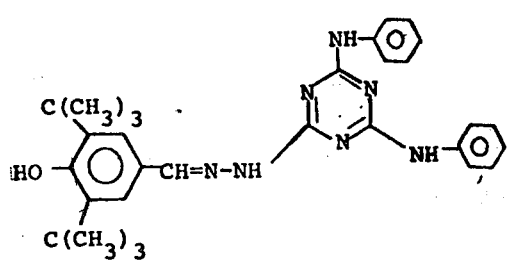

4. A compound of claim 2, of the formula:

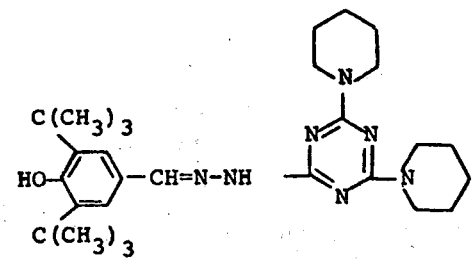

5. A compound of claim 2, of the formula:

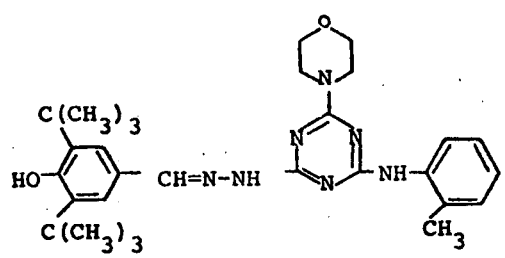

6. A compound of claim 1, of the formula:

7. A compound of claim 1, of the formula:
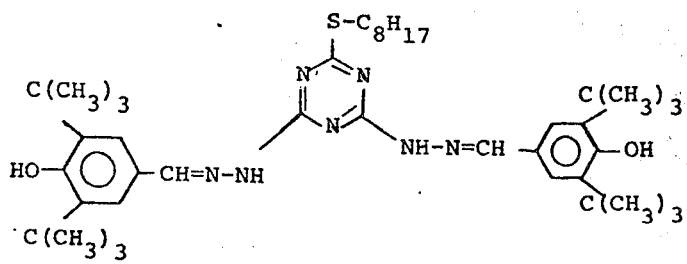
8. A compound of claim 1, of the formula:
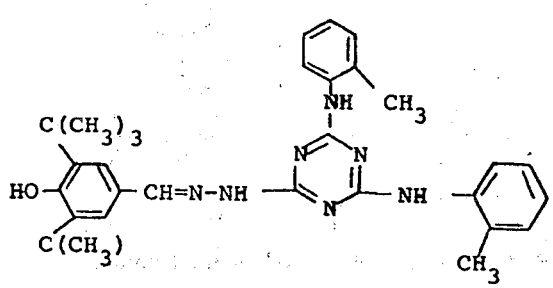
9. A compound of claim 1, of the formula:
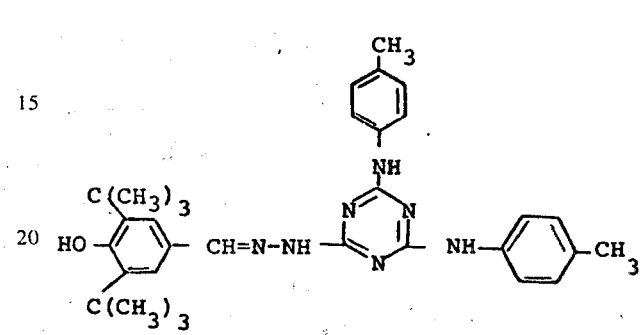
10. A compound of claim 1, of the formula:
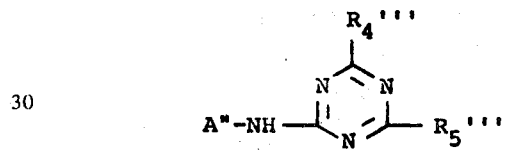
wherein A'' is as defined in claim 3, and $R_4'''$ and $R_5'''$ are each, independently, a piperidino or morpholino ring or a group —X''—$R_{14}''$, wherein X'' is —NH, —N—$CH_3$ or —N—$C_2H_5$ and $R_{14}''$ is alkyl ($C_1$-$C_{12}$) or phenyl.
* * * * *